(12) United States Patent
Bracalente et al.

(10) Patent No.: US 9,251,760 B2
(45) Date of Patent: Feb. 2, 2016

(54) COPY PROTECTION FROM CAPTURE DEVICES FOR PHOTOS AND VIDEOS

(71) Applicant: Cisco Technology, Inc., San Jose, CA (US)

(72) Inventors: Robert Michael Bracalente, Raleigh, NC (US); John Albert Toebes, Cary, NC (US); David Frank Baker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 13/933,960

(22) Filed: Jul. 2, 2013

(65) Prior Publication Data

US 2015/0009248 A1 Jan. 8, 2015

(51) Int. Cl.
| | |
|---|---|
| G09G 5/10 | (2006.01) |
| G09G 5/02 | (2006.01) |
| H04N 5/913 | (2006.01) |
| G06F 21/00 | (2013.01) |
| H04N 1/00 | (2006.01) |
| G06T 1/00 | (2006.01) |

(52) U.S. Cl.
CPC ... *G09G 5/02* (2013.01); *G06F 21/00* (2013.01); *H04N 1/00838* (2013.01); *H04N 5/913* (2013.01); *G06T 1/005* (2013.01); *G06T 1/0028* (2013.01); *G06T 2201/0051* (2013.01)

(58) Field of Classification Search
CPC .................. G09G 2320/0276; G09G 2360/16; G09G 2320/0626
USPC .................................... 345/690–693; 382/100
See application file for complete search history.

(56) References Cited

U.S. PATENT DOCUMENTS

| | | |
|---|---|---|
| 2006/0029252 A1 | 2/2006 | So |
| 2010/0045690 A1* | 2/2010 | Handschy et al. ............ 345/549 |
| 2010/0098288 A1 | 4/2010 | Thiebaud et al. |
| 2012/0081419 A1* | 4/2012 | Abe ............................... 345/691 |
| 2012/0288131 A1* | 11/2012 | Vaerum et al. ................. 381/378 |
| 2013/0147860 A1* | 6/2013 | Ishida ........................... 345/690 |

FOREIGN PATENT DOCUMENTS

| | | |
|---|---|---|
| EP | 1843584 A1 | 10/2007 |
| EP | 1986428 A1 | 10/2008 |
| WO | 2005/027529 A1 | 3/2005 |

OTHER PUBLICATIONS

International Search Report for PCT/US2014/045188, Sep. 12, 2014.

* cited by examiner

*Primary Examiner* — Kimnhung Nguyen
(74) *Attorney, Agent, or Firm* — Patterson + Sheridan, LLP

(57) ABSTRACT

Embodiments provide techniques for providing copy protection from capturing a displayed image using one or more camera devices. Embodiments generate a plurality of frames, based on the received image, such that when the plurality of frames are displayed using at least a threshold refresh rate, the displayed plurality of frames appears as the received image when viewed by a user, and the displayed plurality of frames appears as one of a plurality of other images when captured by an image capture device. The plurality of frames are then output for display on one or more display devices configured to use at least the threshold refresh rate.

21 Claims, 10 Drawing Sheets

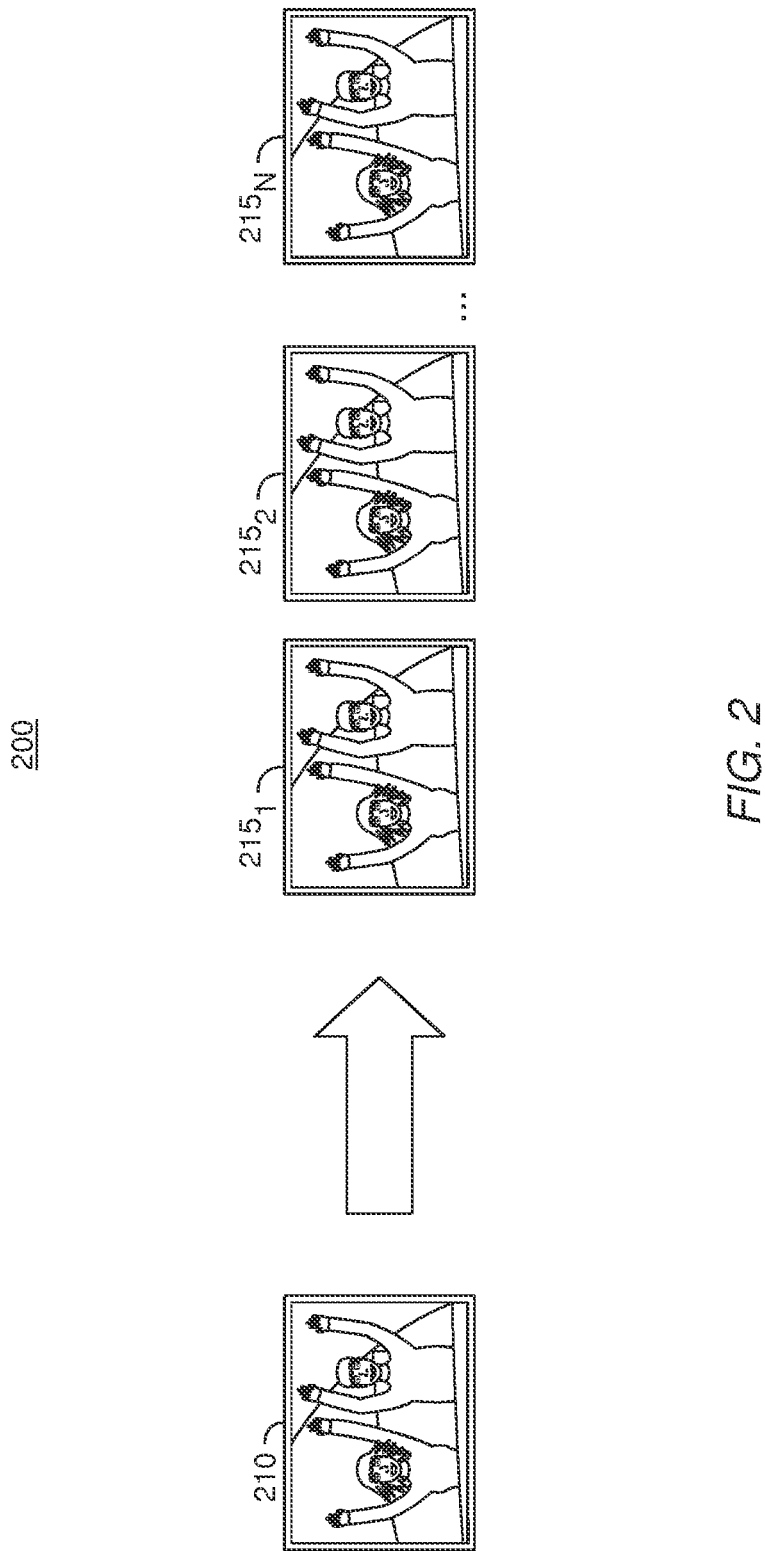

COPY PROTECTION FROM CAPTURE DEVICES FOR PHOTOS AND VIDEOS

TECHNICAL FIELD

Embodiments presented in this disclosure generally relate to copy prevention techniques, and more specifically to preventing an image capture device from capturing an unaugmented representation of the image by displaying an image as a sequence of augmented frames.

BACKGROUND

As the use of computing technology and computer networks (e.g., the Internet) continues to accelerate, the ease with which digital media and files can be copied has created a need for copy protection schemes. Typically, cryptographic systems permit only valid keyholders with access to encrypted data. However, once decrypted, it is difficult to track the reproduction or retransmission of such data. Thus, such schemes provide insufficient protection against unauthorized reproduction of information. A digital watermark can be inserted into a document to address this problem. Such a watermark may be visible and include an identification code permanently embedded in the data. That is, the identification code remains present within the data after any decryption process, and can be used to detect and protect against the unauthorized reproduction of the data. One example of a digital watermark includes a visible seal inserted into an image to identify the copyright owner. However, a watermark could also contain additional information, including the identity of the purchaser of a specific copy of the image, in order to better track the reproduction of the specific copy.

A number of schemes have been proposed for watermarking digital data. For instance, one watermarking procedure includes varying each copy of a document by a marginal amount, so that each copy of the document appears to be the same when viewed by the human eye, and such that each copy of the document is a unique variation. In such a system, although the slight variations are invisible to the human eye, the unique variations can be detected by analyzing the document and thus can be used to identify the origin a particular copy of the document. Whichever watermarking technique is used, it is generally preferable for the watermark to be difficult to remove without destroying the document. Doing so helps ensure that copies of watermarked documents can be traced back to the specific version from which it was created.

Additionally, a need exists for copy prevention techniques that prevent photographs from being taken of displayed content, and this need has become particular pronounced due to the proliferation of digital cameras (e.g., mobile device configured with a digital camera). For example, many amusement parks offer a service in which visitors' photographs are taken during a particular ride or attraction (e.g., a roller coaster), and these photographs can then be sold to the visitors for a nominal fee. Oftentimes, previews of these photographs are shown to visitors to encourage them to purchase a copy of such photographs. However, due to the increased popularity of digital cameras (including mobile devices equipped with digital cameras), some users may simply take a digital picture of the preview copy using their digital camera, rather than paying for the copy of their personal photograph. As a result, some amusement parks have resorted to showing only low resolution previews of the photographs, while other vendors have stopped showing previews altogether. These solutions are not ideal, however, since high quality preview images can help encourage visitors to purchase a copy of their personal photograph.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 illustrates an example of converting an image into a series of frames, according to one embodiment described herein.

DESCRIPTION

Overview

Figure 1:
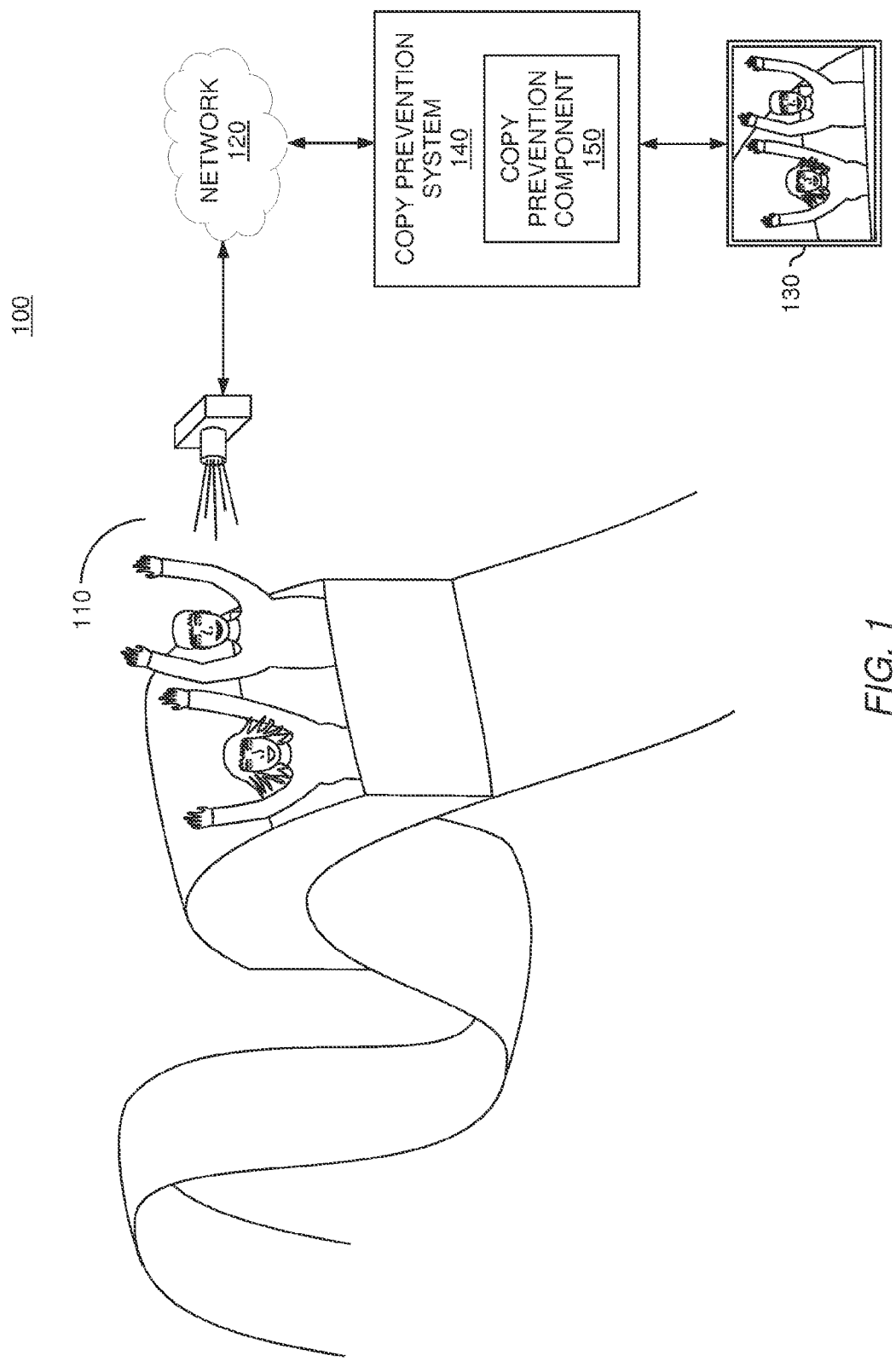
FIG. 1 illustrates a system configured with a copy prevention component, according to one embodiment described herein.

Embodiments provide a method, computer program product and system for preventing unwanted copying of a displayed image. The method, computer program product and system include receiving an image to display. Additionally, the method, computer program product and system include generating a plurality of frames based on the received image. Here, each of the plurality of frames is different from the received image. Moreover, the plurality of frames are generated such that, when the frames are displayed using at least a threshold refresh rate, the displayed frames appear as the received image when viewed by a person, yet appear as one of a plurality of other images when captured by image capture devices. The method, computer program product and system also include outputting the plurality of frames for display on a display device configured to present the generated plurality of frames using at least the threshold refresh rate.

DESCRIPTION OF EXAMPLE EMBODIMENTS

Today, theme parks or other attractions frequently offer a service where a visitor's photograph is taken during a ride or in front of an attraction. The visitor is then able to purchase a copy of the photograph. As visitors may be reluctant to purchase such a photograph sight unseen, many theme parks offer a preview service through which the visitors can view their photographs. However, certain visitors may circumvent the purchasing of their photographs by taking a picture of the preview. This is particularly common at theme parks and attractions, since many visitors bring their personal cameras to such places. Moreover, visitors today are generally more likely to have a camera with them at all times due to the popularity of mobile devices configured with a camera. In response, some locales have taken to restricting access to the photograph preview (e.g., by having an attendant manually show the preview to visitors upon request), while other sites and attractions have stopped showing the preview photographs altogether. However, these solutions are not ideal, as there are additional costs and delays incurred from restricting the visitors' access to their photographs, and not showing the preview altogether may negatively impact the sales of the photographs, as users may be less likely to purchase their photograph sight unseen.

As such, embodiments provide techniques to prevent park visitors from capturing a displayed image using their personal camera device(s). In one embodiment, a presentation system receives an image to be displayed. For instance, an image of a visitor on a ride at a theme park is captured. The presentation system then generates a plurality of frames, based on the received image. However, the plurality of frames are displayed using a threshold refresh rate such that the frames appear as the actual image when viewed by a user but appears as a different image when captured by an image capture device. That is, the plurality of frames includes multiple, distinct frames that all differ in some way from the image itself. However, the plurality of frames, when viewed using at least the threshold refresh rate, may be perceived by the human eye as the image, while a camera device operating at a standard shutter speed captures only one of the distinct frames. The frames are displayed on a display device configured to operate using the threshold refresh rate. Advantageously, doing so prevents the displayed image from being captured using camera devices.

An example of such an embodiment is shown in FIG. 1, which illustrates a system configured with a copy prevention component, according to one embodiment. As shown, the system 100 includes a camera device 110 and a copy prevention system 140, interconnected via a network 120. Here, the network 120 is representative of any data communications network between the camera device 110 and the copy prevention system 140, including wired networks, wireless networks, etc. Examples of the network 120 include a local area network, the Internet, a Bluetooth® communication link, and so on.

The copy prevention system 140 includes a copy prevention component 150 and is communicatively coupled to a display device 130. In this embodiment, the camera device 110 is configured to capture an image of theme park visitors as they pass a point on a roller coaster attraction. The captured image is then transmitted to the copy prevention system 140 (i.e., via the network 120) and a preview of the captured image may be shown using the display device 130. Note, while embodiments are discussed herein using a theme park as a reference example, the techniques described herein may be used in any number of different environments and situations. More generally, embodiments may provide copy protection from image capture devices (e.g., cameras) for any displayed image, in any environment and displayed on any time of display device, consistent with the functionality described herein.

After receiving the image from the camera device 110, the copy prevention component 150 may generate a plurality of frames based on the image. FIG. 2 shows an example of converting an image into a series of frames, according to one embodiment. As shown, depiction 200 includes an input image 210 converted into a plurality of frames $215_{1-N}$. Generally, the copy prevention component 150 is configured to generate the frames $215_{1-N}$, such that each of the frames $215_{1-N}$ differs in some way from the input image 210. Further, at least two of the frames $215_{1-N}$ differ from one another. Although each of the frames $215_{1-N}$ differs from the image 210 itself, the plurality of frames may appear as the image to the human eye, when displayed at a threshold refresh rate or greater. Generally speaking, while a higher refresh rate may typically improve the appearance of the image to the human eye, any refresh rate at which the human eye can perceive the image may be said to be sufficiently high within the context of the present disclosure, even if the image is perceived as having some noise or flickering effects. However, an image capture device having a standard shutter speed (or, more specifically, any shutter speed faster than the refresh rate at which the image is displayed) would capture an image of one of the plurality of frames which differ from the image, rather than the image itself. Doing so allows visitors to view their photographs on the display device 130, while preventing the visitors from capturing an image of the photograph shown on the display device 130 using a camera.

In addition to providing copy protection for a displayed image, the copy prevention component 150 may also provide copy protection for a displayed video. For example, the copy prevention component 150 may generate a sequence of one or more frames for each frame of the video, and may output the generated sequences of frames for display at a sufficiently high refresh rate, such that the human eye will perceive the animated sequence of the video when viewing the displayed frames. However, as with frames generated for an image, a camera device may capture one of the generated frames, rather than the corresponding frame of the video itself, when capturing an image (or a video) of the displayed frames. For instance, a video displayed at a frame rate of 48 frames per second (FPS) or higher could be used to provide copy protection against the majority of video cameras, which typically capture frames at a rate of 24 to 30 FPS. Advantageously, doing so allows the user to view the displayed video, while providing copy protection for the displayed video against both image capture devices and video capture devices attempting to capture the displayed video.

Figure 3A:
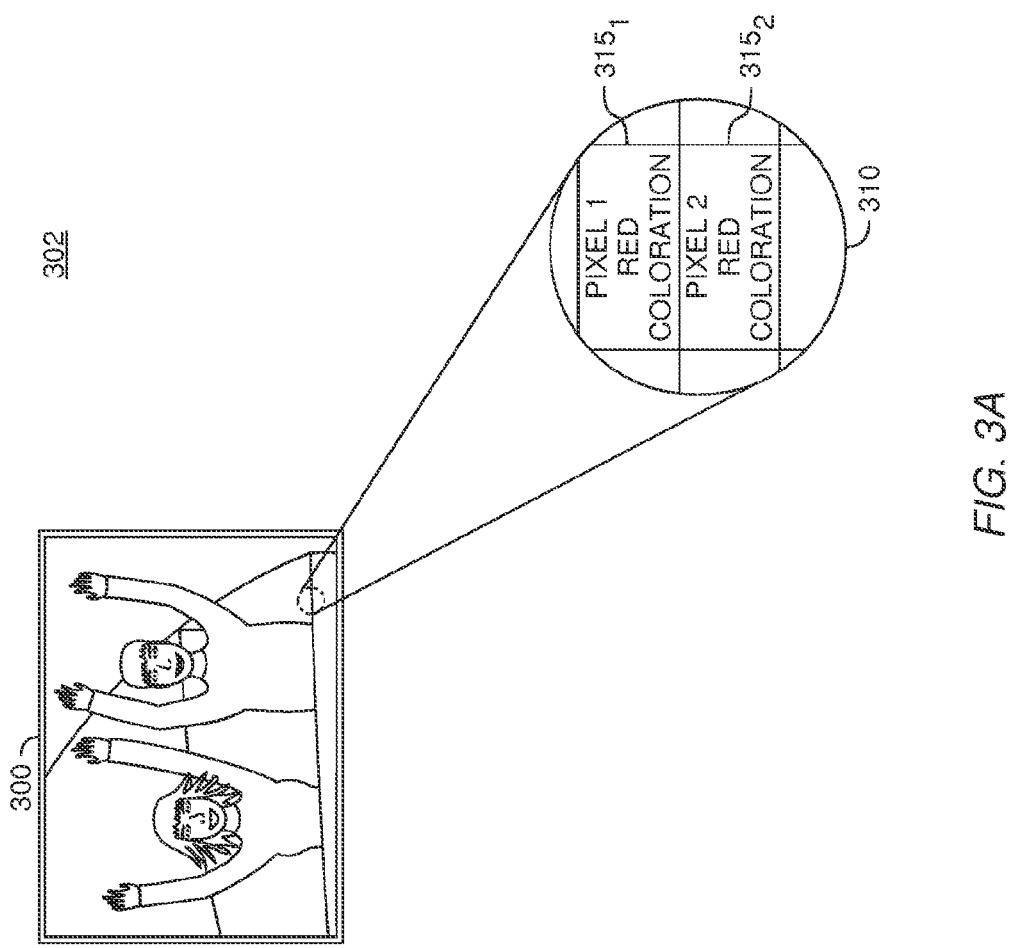
FIGS. 3A-C illustrate frames augmented by a copy prevention component, according to one embodiment described herein.
Figure 3B:
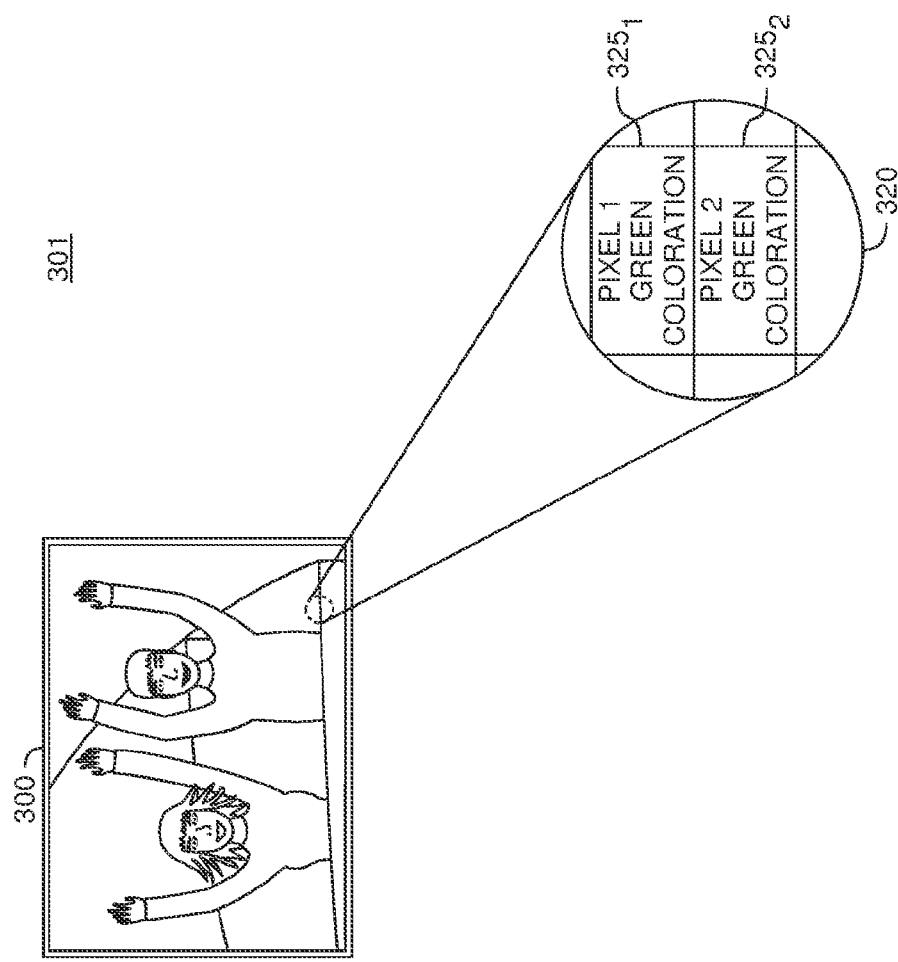
Figure 3C:
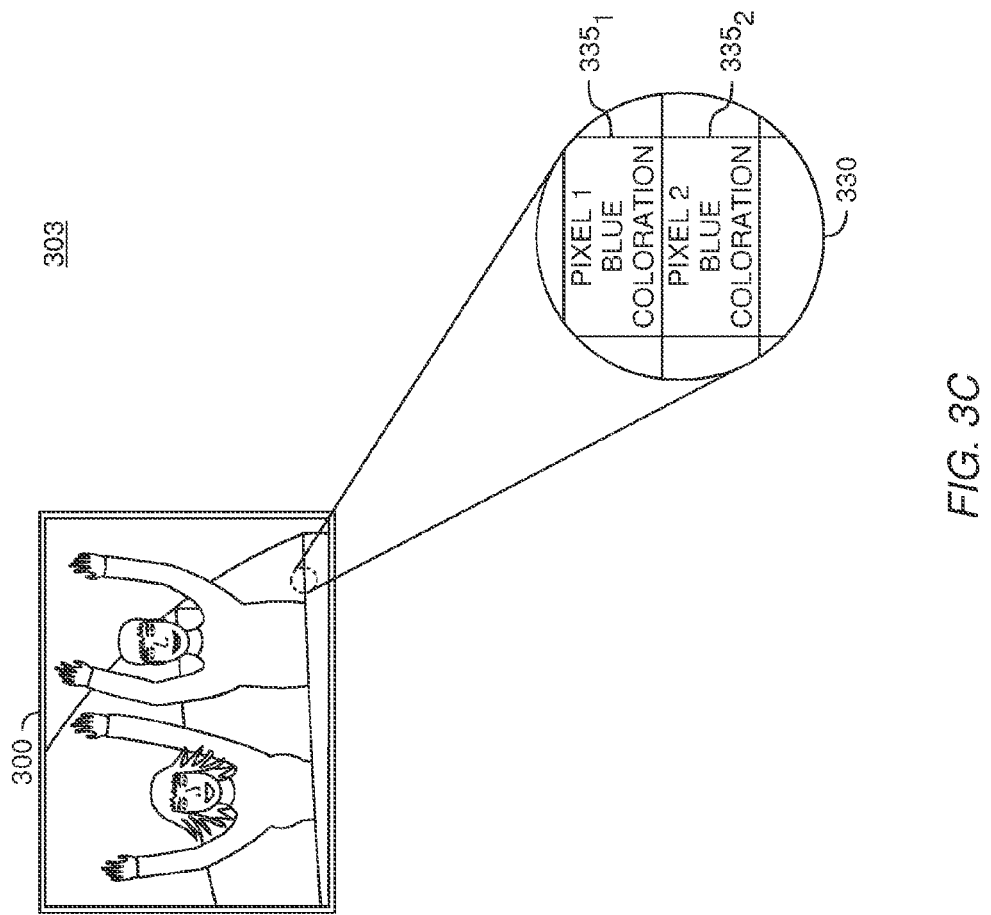

The copy prevention component 150 may use a variety of techniques to generate the sequence of frames based on the image. For example, in one embodiment, the copy prevention component 150 uses color separation techniques to generate the frames. FIGS. 3A-C show an example set of frames augmented by a copy prevention component, according to one embodiment. For this example, assume image 210 is represented using an RGB color model, where each pixel of the image 210 includes a red color value, a green color value, and a blue color value. Of course, other color models (or luminance models) may be used, consistent with the functionality described herein.

Here, the copy prevention component 150 could generate a first frame that includes only the red color value for the pixels in the image 210. FIG. 3A shows an example of such a frame. Here, the depiction includes the generated first frame 300, and a magnified view 310 of the frame 300. The magnified view 310 includes pixels $315_{1-2}$, which only contain the red color values from the corresponding pixels in the image 210.

The copy prevention component 150 could then generate a second frame that includes pixels containing only the green color values from the image 210. FIG. 3B shows an example of this which includes both the generated second frame 301 and a magnified view 320 of the second frame 301. The magnified view 320 includes pixels $325_{1-2}$, which contain only the green color values from the corresponding pixels in the image 210. Likewise, in FIG. 3C, a third frame 302 contains only the blue color values from the image 210, as shown by the magnified view 330 and the depicted pixels $335_{1-2}$.

After generating the first frame, the second frame and the third frame, the copy prevention component 150 could arrange the frames such that the sequence of frames repeats indefinitely when displayed. When the repeating sequence of frames is displayed at a sufficient refresh rate, the frames may appear as the image 210 to the human eye. That is, although the human eye may perceive a slight flickering or noise from the displayed frames, the eye will blend the red, green and blue colors together to form the colors in the image 210, when the frames are displayed at a sufficiently high refresh rate. However, a camera (having a shutter speed at least as fast as the refresh rate of the display device(s) displaying the frames) would capture only one of the frames, when taking a picture of the display device displaying the frames. Advantageously, this can prevent a camera from taking a picture of the image 210, as the captured images contain only the red, green and blue coloration of the image 210 (assuming the image capture device operates at a sufficiently fast refresh rate). Moreover, even an image capture device operating at a slower refresh rate may produce a less than ideal image and help deter users from photographing the displayed representation of the image 210.

In addition to color separation, the copy prevention component 150 may use other techniques to generate the frames $215_{1-N}$ representing the image 210. For instance, one embodiment is specifically adapted for use with photographs of a group of individuals. In such a case, the copy prevention component 150 could perform a facial recognition analysis of the image 210 to identify distinct human faces within the image 210. The copy prevention component 150 could then generate the plurality of frames $215_{1-N}$ for the image 210, such that at least one of the identified human faces within the image 210 is altered and/or obscured in each of the frames.

Figure 4A:
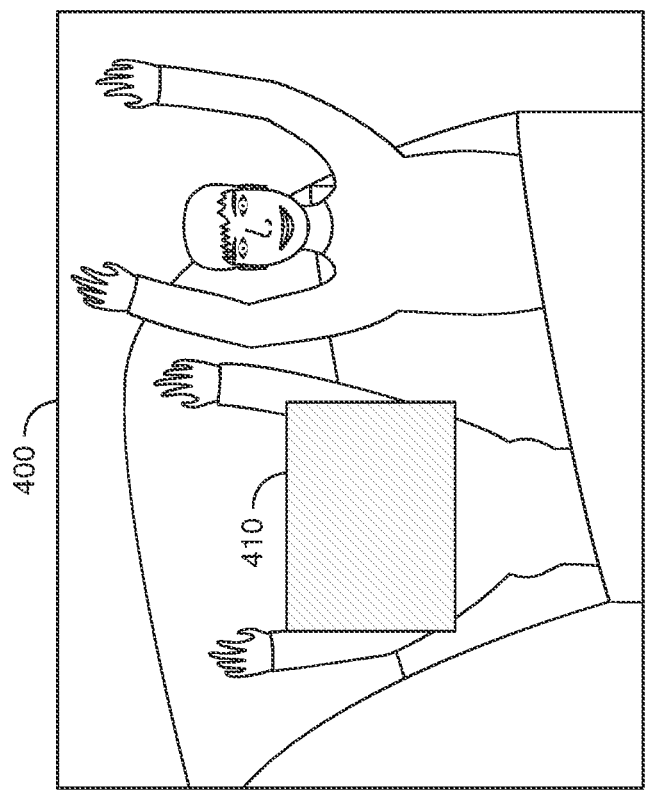
FIGS. 4A-C illustrate frames augmented by a copy prevention component, according to one embodiment described herein.
Figure 4B:
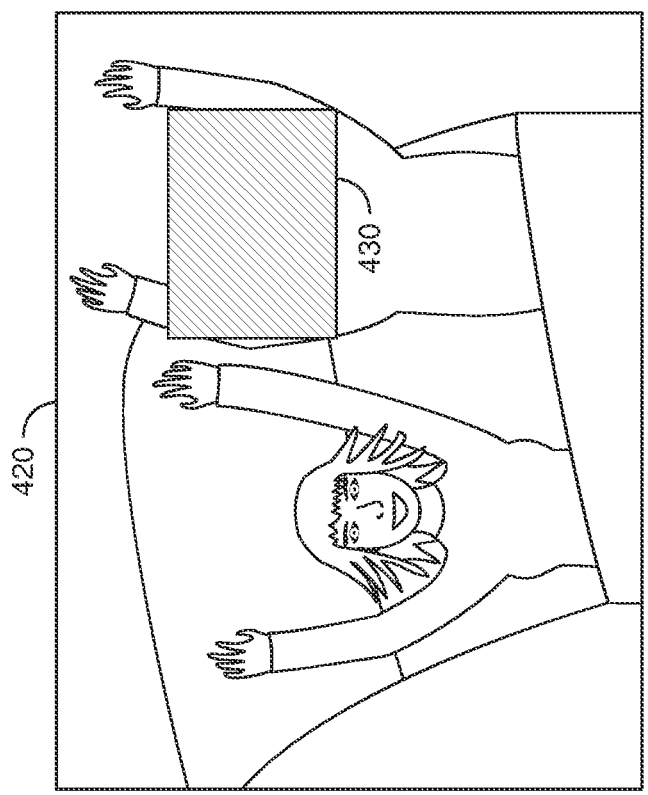
Figure 4C:
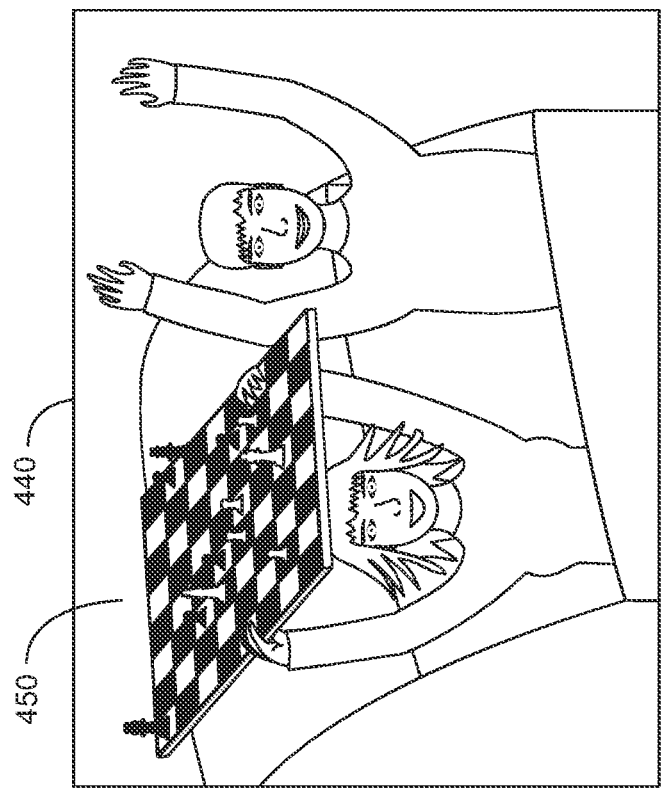

FIGS. 4A-C illustrate examples of frames augmented with a watermark by a copy prevention component, according to one embodiment. FIG. 4A illustrates a first frame 400 in which the copy prevention component 150 has inserted a watermark (here, colored box 410) to obscure one of the identified faces within the image 210. Likewise, FIG. 4B illustrates a second frame 420 in which the copy prevention component 150 has inserted another watermark (i.e., color box 430) to obscure the other face within the image 210. In addition to frames 400 and 420, the copy prevention component 150 could generate other frames in which the boxes 410 and 430 change position within the image 210 and/or change color, so that when the generated frames are displayed as a repeating sequence of frames, the human eye perceives the image 210, while an image capture device taking a picture of the displayed frames would merely capture an image of one of the frames (assuming a shutter speed faster than the refresh rate of the display device).

Although FIGS. 4A-B illustrate an embodiment in which a box is placed over the identified faces within the image 210, the copy prevention component 150 may perform other alterations to the identified faces or to the image 210 in general. For instance, the copy prevention component 150 could insert another graphic (e.g., a smiley face, the face of a well-known fictional character, etc.) on top of one or more of the identified faces, in each of the generated frames. As another example, the copy prevention component 150 could apply an alteration such as a blurring effect on top of the one or more faces, in each of the generated frames.

For instance, FIG. 4C illustrates a frame 440 augmented with a watermark by a copy prevention component, according to one embodiment described herein. Here, the copy prevention component 150 has been configured to identify the people within the image 210, and to insert a graphic of a chessboard 450 into the hands of one of the people. In such an embodiment, the copy prevention component 150 could then be configured to generate a subsequent frame, depicting the other rider holding the chessboard. The copy prevention component 150 could then output the frame 440 and the subsequent frame for display using at least a threshold refresh rate, such that the chessboards are not visible when the frames are viewed with the human eye, but could be visible in an image captured by an image capture device. Additionally, the copy prevention component 150 could be configured to insert images of other objects into the image 210 as well, and more generally it is broadly contemplated that the copy prevention component 150 could be configured to insert any sort of image at any position within the image 210. For instance, in one embodiment, the copy prevention component 150 could generate a sequence of frames in which the people within the image 210 are shown holding a variety of different items (e.g., one item per frame). Doing so may provide a fun way to incentivize users to take multiple pictures of the displayed frames, as each picture could produce an image of the riders holding a different object(s), while still helping to prevent the users from capturing the unaltered image 210.

In another embodiment, the copy prevention component 150 is configured to perform graphical augmentations to faces in each generated frame. For example, the copy prevention component 150 could draw cartoon-style sunglasses and a cartoon-style mustache on one of the faces in one of the frames, imitating graffiti drawn on the identified face within the image 210. In an image 210 with a sufficient number of identified faces, the copy prevention component 150 could continuously move the graffiti for each frame from one face to the next. As such, when the frames are displayed, the graffiti may not be visible to the human eye. However, camera taking a photograph (or video) of the displayed frames would likely capture a photograph of one of the frames containing the graffiti, thus disincentivizing users from taking pictures of the displayed frames (in lieu of purchasing a copy of the image 210). On the other hand, creatively applying "graffiti" to the image 210 across the various frames in a fun, comical manner may incentivize users to take multiple pictures of the displayed frames to see the various "graffiti" effects. However, these photographs would still not produce an unaltered copy of the image 210, thus still preserving the incentive for the users to purchase a copy of the image 210.

Figure 5:
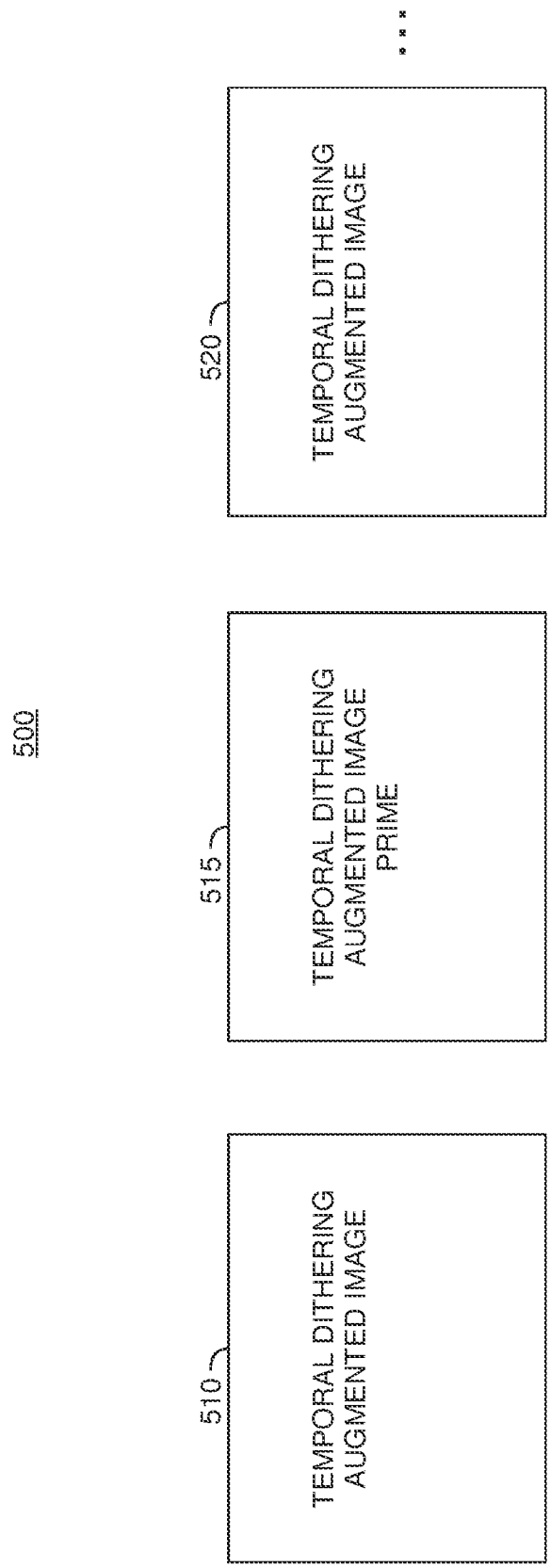
FIG. 5 illustrates frames augmented by a copy prevention component using temporal dithering techniques, according to one embodiment described herein.

In one embodiment, the copy prevention component 150 is configured to use temporal color dithering in inserting the moving watermarks into the image. An example of this is shown in FIG. 5, which illustrates a sequence of frames augmented by a copy prevention component using temporal dithering techniques, according to one embodiment. Here, the sequence of frames 500 includes a first frame 510 where a color augmentation has been applied and a second frame 515 where an inverse color augmentation has been applied. A repeat of the first frame 520 is next in the sequence 500, and the pattern of the first frame followed by the second frame continues as long as the sequence is displayed. Generally, when using temporal dithering, the copy prevention component 150 is configured to alternate a pixel's color between a first color and a second color (and possibly other colors as well) at a sufficiently high refresh rate, such that the human eye will perceive the first color and the second color blending together to produce a third color. The copy prevention component 150 may be configured to apply temporal dithering to a portion of the image 210 or to the entirety of the image 210.

As an example, the copy prevention component 150 could generate a first frame by applying a first color augmentation to all (or a portion) of the image 210. As an example, the first color augmentation could increase the amount of red coloration in each pixel of the image 210. More generally, however, any color augmentation may be used. The copy prevention component 150 could then compute an inverse coloration that, when used to generate a subsequent frame, causes the human eye to see the proper coloration of the image 210 when viewing the first frame and the subsequent frame alternating at a sufficiently high refresh rate. Thus, as an example, if the first color augmentation increases the amount of red coloration in each pixel of the image 210, the inverse color augmentation could decrease the amount of red coloration in each pixel. The copy prevention component 150 could then output the sequence of frames for display at a sufficiently high refresh rate, such that the user will see the image 210 (or a near approximation of the image 210) when viewing the sequence of frames. However, a camera taking a picture of the display will merely capture one of the augmented frames (i.e., the first frame or the second frame) in the sequence of frames, assuming a sufficiently short shutter speed relative to the display's refresh rate.

While the above example involves a single color augmentation and an inverse color augmentation, the copy prevention component 150 may be configured to apply temporal dithering using multiple color augmentations. For example, in one embodiment, the copy prevention component 150 may vary the color augmentation over time and calculate a separate inverse color augmentation for each variation. Additionally, the copy prevention component 150 could apply a different color augmentation for each of a plurality of portions of the image 210 (i.e., one or more pixels of the image) and could calculate separate inverse color augmentations for each portion as well. For example, the copy prevention component 150 could randomly select, for pixels in the image 210, whether a first color augmentation or a second color augmentation should be applied to the pixel in a first frame. Continuing this example, the copy prevention component 150 could then determine an inverse color augmentation for each pixel, based on whether the first color augmentation or the second color augmentation was applied to the pixel in the first frame, and could generate a second frame based on the determined inverse color augmentations. The copy prevention component 150 could then display this sequence of frames at a sufficiently high refresh rate, so that the sequence of frames will appear as the image 210 when viewed by the human eye. Alternatively, the copy prevention component 150 could then generate a third frame by applying a different augmentation(s) to a portion of the image 210, and could generate a fourth frame by applying an inverse color augmentation(s) based on the augmentation(s) applied in the third frame. This can continue indefinitely or for a predetermined number of different color augmentations and inverse color augmentations.

In a particular embodiment, the copy prevention component 150 is configured to applying Floyd-Steinberg dithering in order to diffuse an amount of error into subsequent or neighboring pixels. For instance, the copy prevention component 150 could determine that no exact inverse color augmentation match exists for a particular combination of a pixel color and a first color augmentation, and could determine an amount of coloration error introduced when the closest match inverse color augmentation is applied. As another example, the copy prevention component 150 could calculate the inverse color augmentation to include a given amount of coloration error for some pixel in the image 210. The copy prevention component 150 could then incorporate the coloration error into subsequent corresponding pixels of the sequence of frames (or to neighboring pixels in the frame). In doing so, when the sequence of frames is displayed at a sufficiently high refresh rate, the human brain will blend the colors together and will perceive the correct colors from the image 210. However, an image capture device capturing only a single frame of the sequence of frames will not capture the image 210, but rather will capture a frame generated by applying some color augmentation to the image. In an embodiment where a separate augmentation is applied to portions of the image (e.g., to every pixel), the frame captured by the image capture device may only loosely resemble the image 210, if at all.

As another example, the copy prevention component 150 could be configured to apply temporal dithering together with a moving watermark based on facial recognition analysis. For instance, when inserting the first watermark 410 into the image, the copy prevention component 150 could apply a first color augmentation to the rectangular region represented by the watermark 410. As an example, the copy prevention component 150 could adjust all of the pixels within the region represented by the box 410, so that the adjusted pixels contain additional red coloration, and could do the same for the pixels in the region represented by the box 430. The copy prevention component 150 could then compute an inverse color augmentation for the pixels in the regions represented by the boxes 410 and 430, such that when the human eye perceives the corresponding colors from the image 210, when the human eye sees the augmented by the first color augmentation sequenced with the pixels augmented by the inverse color augmentation at a sufficient refresh rate. However, images captured using the sequenced frames would show one of the frames in which a region of the image 210 (i.e., here, the region corresponding to the visitors' faces) has been augmented using either the first color augmentation of the inverse color augmentation. Advantageously, doing so helps to prevent a camera from capturing the image 210, while allowing human viewers to perceive the image 210 from the displayed frames.

In a particular embodiment, the copy prevention component 150 apply color augmentations and inverse color augmentations to the image 210, in such a way as to introduce a watermark into each frame. For example, the copy prevention component 150 could generate a first frame by selectively apply a first color augmentation to only certain pixels in the image 210, and the copy prevention component 150 could then apply a second color augmentation to the other pixels within the image 210, such that the first frame contains a particular QR code created by the first and second color augmentations. Such a QR code could be tied to, for instance, a URL that, when scanned, directs the user to a website where a copy of the image 210 may be purchased. As an example, the copy prevention component 150 could generate the frame by applying a darkening color augmentation to pixels where the QR code should appear, and by applying a lightening color augmentation to other pixels within the image. The copy prevention component 150 could then generate a subsequent frame by applying a reverse color augmentation to each of the pixels in the image 210, based on whether the respective pixel received the lightening color augmentation or the darkening color augmentation in the first frame. The generated frames may then be displayed at a sufficiently high refresh rate as a repeating sequence of frames. Advantageously, doing so enables a user to perceive the image 210 when viewing displayed sequence of frames, while camera devices capturing images of the displayed sequence of frames would instead capture one of the frames containing the QR code.

Figure 6:
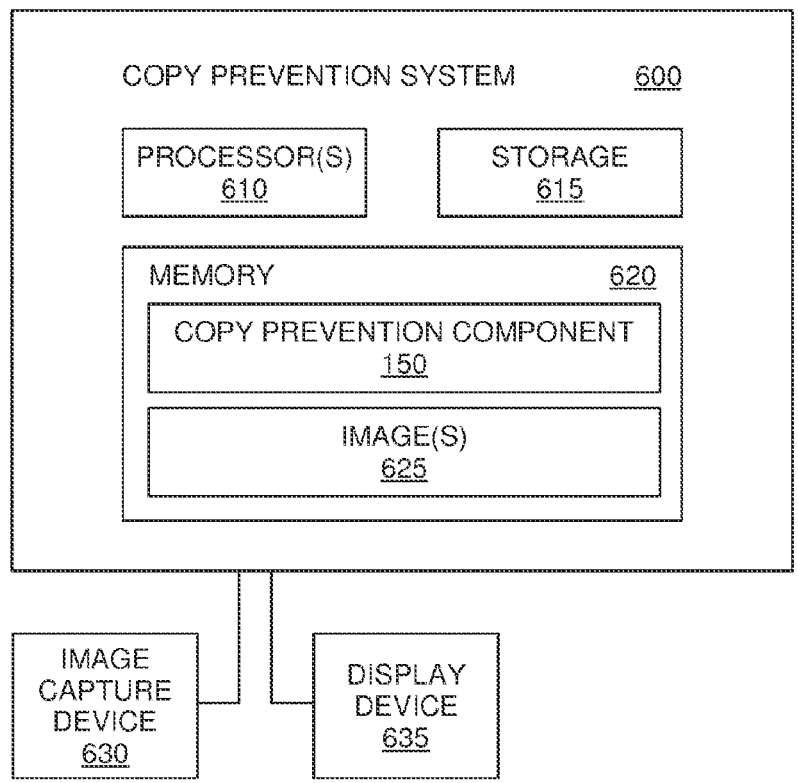
FIG. 6 illustrates a system configured with a copy prevention component, according to one embodiment described herein.

FIG. 6 illustrates a system configured with a copy prevention component, according to one embodiment described herein. In this example, the copy prevention system 600 includes, without limitation, a processor 610, storage 615, memory 620, an image capture device(s) 630, and a display device(s) 635. Generally, the processor 610 retrieves and executes programming instructions stored in the memory 620. Processor 610 is included to be representative of a single CPU, multiple CPUs, a single CPU having multiple processing cores, GPUs having multiple execution paths, and the like. The memory 620 is generally included to be representative of a random access memory. The system 600 may also include a network interface(s) which enables the system 600 to connect to a data communications network (e.g., wired Ethernet connection or an 802.11 wireless network). Further, while the depicted embodiment illustrates the components of a particular system 600, one of ordinary skill in the art will recognize that such systems may use a variety of different hardware architectures. Specifically, in one embodiment, the system 600 is configured for use with a projection system comprising one or more projection devices, in lieu of or in addition to display device(s) 635. Moreover, it is explicitly contemplated that embodiments of the invention may be implemented using any device or computer system capable of performing the functions described herein.

The memory 620 represents any memory sufficiently large to hold the necessary programs and data structures. Memory 620 could be one or a combination of memory devices, including Random Access Memory, nonvolatile or backup memory (e.g., programmable or Flash memories, read-only memories, etc.). In addition, memory 620 and storage 615 may be considered to include memory physically located elsewhere; for example, on another computer communicatively coupled to the system 600. Illustratively, the memory 620 includes a copy prevention component 150 and one or more images 625 for display. Such a memory may also include an operating system (not shown), which generally controls the execution of application programs on the system 600. Examples of operating system may include UNIX, a version of the Microsoft Windows® operating system, and distributions of the Linux® operating system.

As discussed above, the copy prevention component 150 generally is configured to provide copy protection from capturing a displayed image 625 using one or more camera devices. For instance, the copy prevention component 150 may generate a plurality of frames, based on the image 625, such that when the plurality of frames are displayed using at least a threshold refresh rate, the displayed plurality of frames appears as the received image when viewed by a user, and the displayed plurality of frames appears as one of a plurality of other images when captured by an image capture device. The plurality of frames is then output for display using the display device 635 using at least the threshold refresh rate.

Figure 7:
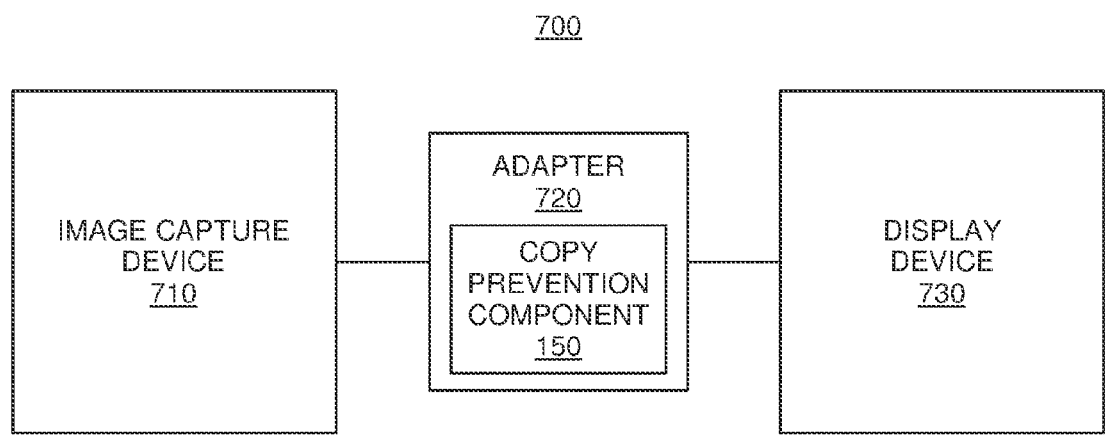
FIG. 7 illustrates an adapter configured with a copy prevention component, according to one embodiment described herein.

FIG. 7 illustrates an adapter configured with a copy prevention component, according to one embodiment described herein. Here, the system 700 includes an adapter 720 that is coupled to both an image capture device 710 (e.g., one or more cameras) and a display device(s) 730. The adapter 720 includes a copy prevention component 150. In such an embodiment, the copy prevention component 150 may be implemented as hardware logic, software logic or a combination thereof. Here, the adapter 720 generally represents any device positioned on the communications path between the image capture device 710 and the display device(s) 730, that is adapted to receive input (e.g., data characterizing one or more images) from the image capture device 710 and to output processed data to the display device(s) 730. Such a device may be preferable, for example, as a relatively low cost way of providing copy prevention for an existing image display system.

For instance, as discussed above, the copy prevention component 150 is generally configured to receive an image (e.g., from the image capture device 710) and to generate a sequence of frames based on the image, and all of which are different from the image, such that the sequence of frames appears to the human eye as the received image when the sequence of frames is displayed on the display device 730 using at least a threshold refresh rate. For example, as discussed above, the copy prevention component 150 could be configured to generate a repeating sequence of frames that includes a first frame containing only the red color values for each pixel in the image, a second frame containing only the green color values for each pixel in the image, and a third frame containing only the blue color values for each pixel in the image. The copy prevention component 150 could then output the generated repeating sequence of frames to the display device 730 for display. Advantageously, by incorporating the copy prevention component 150 into an adapter 720, embodiments may easily and inexpensively be used to provide copy protection for existing image preview systems (e.g., an existing photograph preview station in a theme park).

Additionally, embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a copy prevention component 150 could reside within the cloud, and could receive images to be displayed from a remote system. The copy prevention component 150 could then generate a repeating sequence of frames based on the received image, and could return data characterizing the repeating sequence of frames to the remote system. In one embodiment, the copy prevention component 150 is configured to generate the sequences of frames for a received image, and to further generate an animated image file (e.g., an animated Graphics Interchange Format (GIF) file) using the generated sequence of frames. The copy prevention component 150 could then return (e.g., using a network) the animated image file to the remote system for display. Advantageously, doing so helps to offload the processing of the images to computing resources in the cloud, which is particularly advantageous with computationally intense augmentations.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving an image to display;
generating a plurality of frames based on the received image, wherein each of the plurality of frames is different from the received image, and wherein when the plurality of frames are displayed using at least a threshold refresh rate, the displayed plurality of frames appears as the received image when viewed by a person, and the displayed plurality of frames appears as one of a plurality of other images when captured by the an image capture devices; and
outputting the plurality of frames for display on a display device configured to present the generated plurality of frames using at least the threshold refresh rate.

2. The method of claim 1, wherein the plurality of frames are generated using temporal dithering.

3. The method of claim 2, wherein the plurality of frames comprises a repeating sequence of frames, and wherein generating the plurality of frames further comprises:

generating a first frame of the repeating sequence of frames, such that pixels of the first frame are augmented using a first coloration adjustment;
determining a second coloration adjustment for a second frame of the repeating sequence of frames, based on the first coloration adjustment; and
generating the second frame of the repeating sequence of frames based on the second coloration adjustment,
wherein outputting the plurality of frames for display further comprises outputting the repeating sequence of frames for display on the display device.

4. The method of claim 3, wherein the first frame embeds a first watermark and wherein the second frame embeds a second watermark distinct from the first watermark.

5. The method of claim 1, wherein the plurality of frames comprising a repeating sequence of frames, wherein coloration for each pixel in the repeating sequence of frames is represented using a plurality of color values, and wherein generating the plurality of frames further comprises:
for each of the plurality of color values, generating a respective frame in the repeating sequence of frames, wherein the coloration of each pixel of the generated frame contains only a value for the respective color value.

6. The method of claim 1, wherein generating the plurality of frames further comprises:
inserting a watermark in each frame of the plurality of frames, wherein the watermarks embedded in two or more frames are located at different positions within the respective frames relative to one another.

7. The method of claim 1, wherein generating the plurality of frames further comprises:
identifying a plurality of human faces within the received image; and
generating the plurality of frames, such that at least one of the plurality of human faces is augmented in each of the plurality of frames.

8. A computer program product comprising:
computer code that receives an image to display;
computer code that generates a plurality of frames based on the received image, wherein each of the plurality of frames is different from the received image, and wherein when the plurality of frames are displayed using at least a threshold refresh rate, the displayed plurality of frames appears as the received image when viewed by a person, and the displayed plurality of frames appears as one of a plurality of other images when captured by the an image capture devices;
computer code that outputs the plurality of frames for display on a display device configured to present the generated plurality of frames using at least the threshold refresh rate; and
a non-transitory computer-readable medium storing the computer codes.

9. The computer program product of claim 8, wherein the plurality of frames are generated using temporal dithering.

10. The computer program product of claim 9, wherein the plurality of frames comprises a repeating sequence of frames, and wherein the computer code that generates the plurality of frames further comprises:
computer code that generates a first frame of the repeating sequence of frames, such that pixels of the first frame are augmented using a first coloration adjustment;
computer code that determines a second coloration adjustment for a second frame of the repeating sequence of frames, based on the first coloration adjustment; and computer code that generates the second frame of the repeating sequence of frames based on the second coloration adjustment,
wherein the computer code that outputs the plurality of frames for display further comprises computer code that outputs the repeating sequence of frames for display on the display device.

11. The computer program product of claim 10, wherein the first frame embeds a first watermark and wherein the second frame embeds a second watermark distinct from the first watermark.

12. The computer program product of claim 8, wherein the plurality of frames comprising a repeating sequence of frames, wherein coloration for each pixel in the repeating sequence of frames is represented using a plurality of color values, and wherein the computer code that generates the plurality of frames further comprises:
computer code that, for each of the plurality of color values, generates a respective frame in the repeating sequence of frames, wherein the coloration of each pixel of the generated frame contains only a value for the respective color value.

13. The computer program product of claim 8, wherein the computer code that generates the plurality of frames further comprises:
computer code that inserts a watermark in each frame of the plurality of frames, wherein the watermarks embedded in two or more frames are located at different positions within the respective frames relative to one another.

14. The computer program product of claim 8, wherein the computer code that generates the plurality of frames further comprises:
computer code that identifies a plurality of human faces within the received image; and
computer code that generates the plurality of frames, such that at least one of the plurality of human faces is augmented in each of the plurality of frames.

15. A system, comprising:
a processor; and
a memory containing a program that, when executed by the processor, performs an operation comprising:
receiving an image to display;
generating a plurality of frames based on the received image, wherein each of the plurality of frames is different from the received image, and wherein when the plurality of frames are displayed using at least a threshold refresh rate, the displayed plurality of frames appears as the received image when viewed by a person, and the displayed plurality of frames appears as one of a plurality of other images when captured by the an image capture devices; and
outputting the plurality of frames for display on a display device configured to present the generated plurality of frames using at least the threshold refresh rate.

16. The system of claim 15, wherein the plurality of frames are generated using temporal dithering.

17. The system of claim 16, wherein the plurality of frames comprises a repeating sequence of frames, and wherein generating the plurality of frames further comprises:
generating a first frame of the repeating sequence of frames, such that pixels of the first frame are augmented using a first coloration adjustment;
determining a second coloration adjustment for a second frame of the repeating sequence of frames, based on the first coloration adjustment; and
generating the second frame of the repeating sequence of frames based on the second coloration adjustment,
wherein outputting the plurality of frames for display further comprises outputting the repeating sequence of frames for display on the display device.

18. The system of claim 17, wherein the first frame embeds a first watermark and wherein the second frame embeds a second watermark distinct from the first watermark.

19. The system of claim 15, wherein the plurality of frames comprising a repeating sequence of frames, wherein coloration for each pixel in the repeating sequence of frames is represented using a plurality of color values, and wherein augmenting each of the plurality of frames further comprises:
for each of the plurality of color values, generating a respective frame in the repeating sequence of frames, wherein the coloration of each pixel of the generated frame contains only a value for the respective color value.

20. The system of claim 15, wherein generating the plurality of frames further comprises:
inserting a watermark in each frame of the plurality of frames, wherein the watermarks embedded in two or more frames are located at different positions within the respective frames relative to one another.

21. The system of claim 15, wherein generating the plurality of frames further comprises:
identifying a plurality of human faces within the received image; and
generating the plurality of frames, such that at least one of the plurality of human faces is augmented in each of the plurality of frames.

* * * * *